United States Patent
Tronc et al.

(10) Patent No.: US 9,847,829 B2
(45) Date of Patent: Dec. 19, 2017

(54) SATELLITE COMMUNICATION SYSTEM, LEO SATELLITE RELAYING COMMUNICATIONS BETWEEN A GEO SATELLITE AND TERRESTRIAL STATIONS, THE UPLINKS AND DOWNLINKS USING THE SAME FREQUENCY BAND AND TIME-DIVISION MULTIPLEXING

(75) Inventors: Jerome Tronc, Saint Jean (FR); Jean-Christophe Dunat, Toulouse (FR)

(73) Assignee: AIRBUS DEFENCE AND SPACE SAS, Toulouse (FR)

(*) Notice: Subject to any disclaimer, the term of this patent is extended or adjusted under 35 U.S.C. 154(b) by 291 days.

(21) Appl. No.: 14/125,570

(22) PCT Filed: Jun. 1, 2012

(86) PCT No.: PCT/EP2012/060359
§ 371 (c)(1),
(2), (4) Date: Dec. 11, 2013

(87) PCT Pub. No.: WO2012/171809
PCT Pub. Date: Dec. 20, 2012

(65) Prior Publication Data
US 2014/0105100 A1    Apr. 17, 2014

(30) Foreign Application Priority Data
Jun. 16, 2011 (FR) ...................... 11 01850

(51) Int. Cl.
*H04B 7/212* (2006.01)
*H04B 7/185* (2006.01)
*H04B 7/195* (2006.01)

(52) U.S. Cl.
CPC ..... *H04B 7/18513* (2013.01); *H04B 7/18515* (2013.01); *H04B 7/195* (2013.01)

(58) Field of Classification Search
CPC  H04B 7/185; H04B 7/18513; H04B 7/18515; H04B 7/195; H04B 7/18521;
(Continued)

(56) References Cited

U.S. PATENT DOCUMENTS 5,758,261 A * 5/1998 Wiedeman ........... H04B 7/1856
455/13.1
5,768,684 A * 6/1998 Grubb ................... H04W 52/20
370/318
(Continued)

FOREIGN PATENT DOCUMENTS

EP           0833252 B1      8/2007

*Primary Examiner* — Andrew Chriss
*Assistant Examiner* — Rasha Fayed
(74) *Attorney, Agent, or Firm* — Im IP Law; C. Andrew Im

(57) ABSTRACT

A payload for a repeater satellite of a communication system. The repeater satellite being placed into drift orbit above the surface of a celestial body. The payload being configured to repeat data received from a stationary satellite above the surface of the celestial body towards a terminal substantially at the surface of the celestial body, and to repeat data received from the terminal towards the stationary satellite. The payload is further configured to use a single frequency band for repeating data towards the stationary satellite, referred to as uplink transmission, and for repeating data towards the terminal, referred to as downlink transmission, as well as to time-division multiplex the uplink transmissions and the downlink transmissions. Also, a telecommunication system includes a repeater satellite provided with aforesaid payload, and a satellite communication method for transferring data between the terminal and the stationary satellite.

16 Claims, 5 Drawing Sheets

(58) Field of Classification Search
CPC ............ H04B 7/18578; H04B 7/18528; H04B 7/18504; H04B 1/707; H04B 1/69; H04B 15/00; H04B 10/105; H04B 10/118
USPC ..... 370/321, 318; 455/12.1, 13.2, 13.1, 430, 455/13.4, 52, 10, 69, 522; 375/147, 200, 375/211, 221, 358; 342/354
See application file for complete search history.

(56) References Cited

U.S. PATENT DOCUMENTS

| | | | | |
|---|---|---|---|---|
| 5,867,109 | A * | 2/1999 | Wiedeman | H04B 7/18534 370/328 |
| 5,949,766 | A | 9/1999 | Ibanez-Meier et al. | |
| 6,023,605 | A * | 2/2000 | Sasaki | H04B 7/195 342/354 |
| 6,208,625 | B1 | 3/2001 | Zancho et al. | |
| 6,341,213 | B1 * | 1/2002 | Wu | H04B 7/18515 342/352 |
| 6,411,609 | B1 * | 6/2002 | Emmons, Jr. | H04B 7/18563 370/280 |
| 7,606,567 | B1 * | 10/2009 | Katz | H04B 7/18513 342/352 |
| 8,320,829 | B1 * | 11/2012 | Clebowicz | H04B 7/18521 455/12.1 |
| 9,608,718 | B2 * | 3/2017 | Monsen | H04B 7/18528 |
| 2002/0077099 | A1 | 6/2002 | LaPrade | |
| 2002/0132578 | A1 * | 9/2002 | Wiedeman | H04B 7/18515 455/12.1 |
| 2004/0157554 | A1 * | 8/2004 | Wesel | H04B 7/18578 455/12.1 |
| 2006/0040612 | A1 * | 2/2006 | Min | H04B 7/1858 455/12.1 |
| 2007/0243822 | A1 * | 10/2007 | Monte | H04B 7/2041 455/12.1 |
| 2007/0281609 | A1 * | 12/2007 | Monte | H04B 7/18513 455/12.1 |
| 2011/0143656 | A1 * | 6/2011 | Dankberg | H04B 7/2041 455/10 |
| 2012/0020280 | A1 * | 1/2012 | Jansson | H04B 7/18582 370/316 |

* cited by examiner

| Mean elevation | 5° | 5° | 5° | 5° | 5° |
|---|---|---|---|---|---|
| LEO satellite altitude | 1100 Km | 800 Km | 600 Km | 500 Km | 400 Km |
| Earth's radius | 6378 Km | 6378 Km | 6378 Km | 6378 Km | 6378 Km |
| Satellite view semi-angle | 58.17° | 62.27° | 65.58° | 67.48° | 69.62° |
| Radius of curv. at mean elevation | 1772 Km | 1522 Km | 1321 Km | 1206 Km | 1077 Km |
| Maximum time Between GEO/LEO signals | 7.0 ms | 5.7 ms | 4.8 ms | 4.4 ms | 3.8 ms |

SATELLITE COMMUNICATION SYSTEM, LEO SATELLITE RELAYING COMMUNICATIONS BETWEEN A GEO SATELLITE AND TERRESTRIAL STATIONS, THE UPLINKS AND DOWNLINKS USING THE SAME FREQUENCY BAND AND TIME-DIVISION MULTIPLEXING

RELATED APPLICATIONS

This application is a §371 application from PCT/EP2012/060359 filed Jun. 1, 2012, which claims priority from French Patent Application No. 1101850 filed Jun. 16, 2011, each of which is herein incorporated by reference in its entirety.

FIELD OF THE INVENTION

The invention pertains to the field of long-range data transmission systems. It relates more particularly to systems and methods for data communication (data transfer, remote control, terminal tracking . . . ) between users equipped with small mobile terminals.

CONTEXT OF THE INVENTION AND PROBLEM POSED

The question of long-range data transmission from or to a mobile terminal is posed particularly for connections between computers ("machine to machine" or M2M). This area of transmission is then characterized by a distinctly lower data rate need than for connections of image or internet type, and/or by the ability to use an intermittent rather than continuous connection.

A first approach to this problem is known, followed by existing data transmission systems such as Orbcomm and Argos, which use constellations of satellites in low orbit (LEO for "Low Earth Orbit"). In this approach, the normal mode of operation of each satellite in low orbit LEO requires that it be simultaneously visible firstly to a control and connection ground station and secondly to a user terminal.

The satellite is then used as a communication link between the two parties, and the latency of the acknowledgements of receipt and of the messages is a function of the distance between the satellite and the ground station (GES for "Gateway Earth Station").

However, the coverage provided by the network of ground stations in the systems using low orbit satellites, such as Orbcomm and Argos, is limited by the deployment of ground stations (GES) and the existing systems provide only limited coverage of Earth in this mode. The reason is that each ground station allows coverage over a radius of approximately 3000 km, and each of these systems has around 20 ground stations.

It is then easily noted that the coverage areas exhibit large "white" areas for which the system cannot be used. These areas particularly cover a large share of the ocean areas, or even a significant portion of continental areas such as Africa or Australia.

In cases in which the LEO satellite is not simultaneously visible to the user terminal and to the ground control station (GES), it is necessary to use a communication method of store and send type (a method known to a person skilled in the art by the name "store & forward"). In this method, the message is stored aboard the satellite, which continues its movement on its orbit until it overflies the ground station GES to which it delivers the stored message.

With this method of operation, the communication delays are long and make bidirectional communications difficult under acceptable conditions, given that the delays are typically between a few minutes and the 100 to 150 minutes of duration of a complete orbit of the LEO satellite.

Moreover, examples of hybrid telecommunication systems for the transmission of data between users are known. These hybrid systems are made up of geostationary satellites and of a low orbit satellite constellation.

Notably, a first patent document U.S. Pat. No. 6,208,625 may be cited.

This document describes a network formed by LEO and geostationary (GEO) satellites that are capable of communicating together. On the ground, user terminals are capable of reception/transmission (Rx/Tx) with the LEO and GEO satellites. The LEO component filters the traffic received from the terminals, and, on the basis of the urgent aspect of the received traffic, it directs this traffic either internally to the LEO or to the GEO.

A second patent document EP 0883252 proposes a satellite communication system allowing global coverage, a reduction in the transmission (Tx) delay, and maximization of the use of the capacity of the system (wideband satellite communication through the interconnection of several medium orbit—MEO—and geostationary—GEO—constellations).

The MEO and GEO satellites communicate directly together using intersatellite links, which allows routing of the traffic (for voice and for data) aboard the satellites on the basis of certain rules.

Moreover, this document proposes sharing and reusing the spectrum between the GEO and MEO satellites at very high frequencies (for example between 40 and 60 GHz), so as to allow the function known by the name "seamless handover" for portable terminals (moving from a mobile network to a fixed network without interruption to communication in progress).

It is clear that current hybrid systems exhibit a high level of complexity, synonymous with increased cost for setup and use.

OBJECTS OF THE INVENTION

It is an aim of the invention to provide a solution based on the simplest possible repeater satellites, affording good levels of performance (link budget, availability) within the coverage of each satellite.

SUMMARY OF THE INVENTION

According to a first aspect, the present invention relates to a payload for a repeater satellite in a telecommunication system, said repeater satellite being intended to be put into traveling orbit above the surface of a celestial body, and the payload being configured to repeat data received from a stationary satellite above the surface of the celestial body to a terminal that is substantially on the surface of the celestial body, and to repeat data received from the terminal to the stationary satellite. Said payload is furthermore configured to:
  use a same frequency band for repeating data to the stationary satellite, referred to as "uplink transmission", and for repeating data to the terminal, referred to as "downlink transmission", and
  time multiplex the uplink transmissions and the downlink transmissions.

Such arrangements allow better sharing of the onboard power of the repeater satellite. Moreover, such arrangements allow optimization of the architecture of the payload in order to reduce the cost of manufacture, the bulk and/or the launch weight thereof.

It should be noted that terminal "that is substantially on the surface of the celestial body" is understood to mean notably terrestrial, maritime or aeronautical user terminals. Equally, said terminals are eligible to be put into terrestrial, maritime or aeronautical means, for example.

The text below provides particular embodiments of the payload of a repeater satellite. The invention is likewise aimed at all technically possible combinations of these particular embodiments.

According to one particular embodiment, the payload comprises at least one power amplifier, and said payload is configured to use said power amplifier both for uplink transmissions and for downlink transmissions.

According to one particular embodiment, the payload comprises:
at least one uplink transmission antenna,
at least one downlink transmission antenna,
means for routing a signal at the output of the power amplifier, representative of data to be repeated, either to said uplink transmission antenna or to said downlink transmission antenna.

According to one particular embodiment, the payload has means for multiplexing, at the input of the power amplifier, uplink transmission signals and downlink transmission signals.

According to one particular embodiment, the payload comprises:
a plurality of downlink transmission antennas,
means for routing a signal at the output of the power amplifier, representative of data to be repeated, to any one of said downlink transmission antennas.

According to one particular embodiment, the payload is configured to use the same frequency band, which is used for the uplink transmissions and the downlink transmissions, for receiving data to be repeated from the terminal, referred to as "uplink reception", and for receiving data to be repeated from the stationary satellite, referred to as "downlink reception".

According to one particular embodiment, the payload comprises a plurality of uplink reception antennas, and said payload is configured to receive simultaneously on each of said uplink reception antennas.

According to one particular embodiment, the payload is configured to time multiplex the uplink transmissions and the uplink receptions, and/or to time multiplex the downlink transmissions and the downlink receptions.

According to one particular embodiment, the payload is configured to use a same first frequency sub-band from the frequency band for the uplink receptions and the uplink transmissions, and to use a same second frequency sub-band from the frequency band for the downlink receptions and the downlink transmissions.

According to one particular embodiment, the payload is configured to perform the uplink receptions simultaneously with the downlink transmissions, and to perform the downlink receptions simultaneously with the uplink transmissions.

According to a second aspect, the present invention relates to a telecommunication system that is intended to transfer data between at least one terminal, situated substantially on the surface of a celestial body, and at least one stationary satellite above the surface of the celestial body. The system has one or more signal repeater satellites, said repeater satellites traveling above the surface of the celestial body and having a payload in accordance with the invention.

The text below provides particular embodiments of the telecommunication system. The invention is likewise aimed at all technically possible combinations of these particular embodiments.

According to one particular embodiment, the same frequency band is used for communications between the terminals and the constellation of repeater satellites as for communications between the stationary satellite and the repeater satellite. Preferably, when the terminal is in the coverage area of the stationary satellite, the same frequency band is likewise used for direct communications between the terminals and the stationary satellite.

This affords a significant advantage with respect to solutions from the prior art. The frequency band used by the system may be situated in any of the bands allocated to satellite telecommunication services (low bands, for example UHF or VHF, up to high frequencies such as the Ka and Q bands). Preferentially, the frequency band used is the L band (between 0.9 and 2.0 GHz) which is more particularly appropriate to mobile satellite communications.

According to one particular embodiment, the system has at least one ground station for connecting the stationary satellites. Communications between the ground and the repeater satellites are provided by means of the stationary satellites and the connection stations for these stationary satellites. These communications comprise both the data exchanges between users and potentially the remote control and remote measurement communications of the space repetition means. This embodiment therefore does not require the use of a connection ground station assigned to the repeater satellites.

According to one particular embodiment, at least one repeater satellite is put into polar or quasi-polar orbit (inclination of the orbit greater than 70°) around the celestial body.

According to one particular embodiment:
at least one repeater satellite has means for performing amplification without frequency translation for the signal received from the stationary satellite,
the air interface used is an interface of CDMA (Code Division Multiple Access) type,
and at least one terminal has means for managing the arrival of two signals having delay differences and Doppler differences.

In this case, preferentially, the means for managing the arrival of two signals having delay differences and Doppler differences from the terminal are a receiver of "Rake" type, which is well known to a person skilled in the art.

According to one particular embodiment:
the air interface is of TDMA type,
the system uses two separate signals: one for the stationary satellites and one for the repeater satellites,
time multiplexing is used to share the capacity between the stationary satellites and the repeater satellites with guard intervals and pre-compensation for Doppler on the repeater satellites.

According to one particular embodiment, at least one terminal has means for using space diversity or MIMO (Multiple Input Multiple Output) techniques to recombine the signals coming both from a stationary satellite and from a repeater satellite.

According to one particular embodiment:
  at least one repeater satellite relays the signal, transparently or regeneratively, without frequency translation for the received signal, and
  the air interface has means for limiting the interference on a terminal, between the signals coming from a stationary satellite and the signals relayed by a repeater satellite.

According to one particular embodiment:
  at least one repeater satellite relays the signal, transparently or regeneratively, in an adjacent channel, before it is retransmitted, and
  the telecommunication system has a coordination entity for coordinating the frequency plans between the stationary satellites and the repeater satellites.

According to a third aspect, the present invention relates to a telecommunication method that is intended to transfer data between a terminal, situated substantially on the surface of a celestial body, and a stationary satellite above the surface of the celestial body, the data transfer between said terminal and said stationary satellite being performed by means of a repeater satellite configured to repeat data received from said stationary satellite to said terminal and to repeat data received from said terminal to said stationary satellite. Moreover:
  the repeater satellite uses a same frequency band for repeating data to the stationary satellite, referred to as "uplink transmission", and for repeating data to the terminal, referred to as "downlink transmission",
  the repeater satellite time multiplexes the uplink transmissions and the downlink transmissions.

The text below provides particular modes of implementation of the telecommunication method. The invention is likewise aimed at all technically possible combinations of these particular modes of implementation.

According to one particular mode of implementation, the repeater satellite uses a same power amplifier both for the uplink transmissions and the downlink transmissions.

According to one particular mode of implementation, the repeater satellite uses the same frequency band, which is used for the uplink transmissions and the downlink transmissions, for receiving data to be repeated from the terminal, referred to as "uplink reception", and for receiving data to be repeated from the stationary satellite, referred to as "downlink reception".

According to one particular mode of implementation, the repeater satellite time multiplexes the uplink transmissions and the uplink receptions, and/or said repeater satellite time multiplexes the downlink transmissions and the downlink receptions.

According to one particular mode of implementation, the repeater satellite simultaneously performs the downlink transmissions and the uplink receptions, and simultaneously performs the uplink transmissions and the downlink receptions.

According to one particular mode of implementation, the repeater satellite uses a same first frequency sub-band from the frequency band for the uplink receptions and the uplink transmissions, and uses a same second frequency sub-band from the frequency band for the downlink receptions and the downlink transmissions.

BRIEF DESCRIPTION OF THE FIGURES

The aims and advantages of the invention will be better understood upon reading the description and the figures of particular embodiments, given by way of non-limiting examples, for which the figures represent.

In these figures, identical references denote identical or similar elements.

DETAILED DESCRIPTION OF EMBODIMENTS OF THE INVENTION

Figure 1:
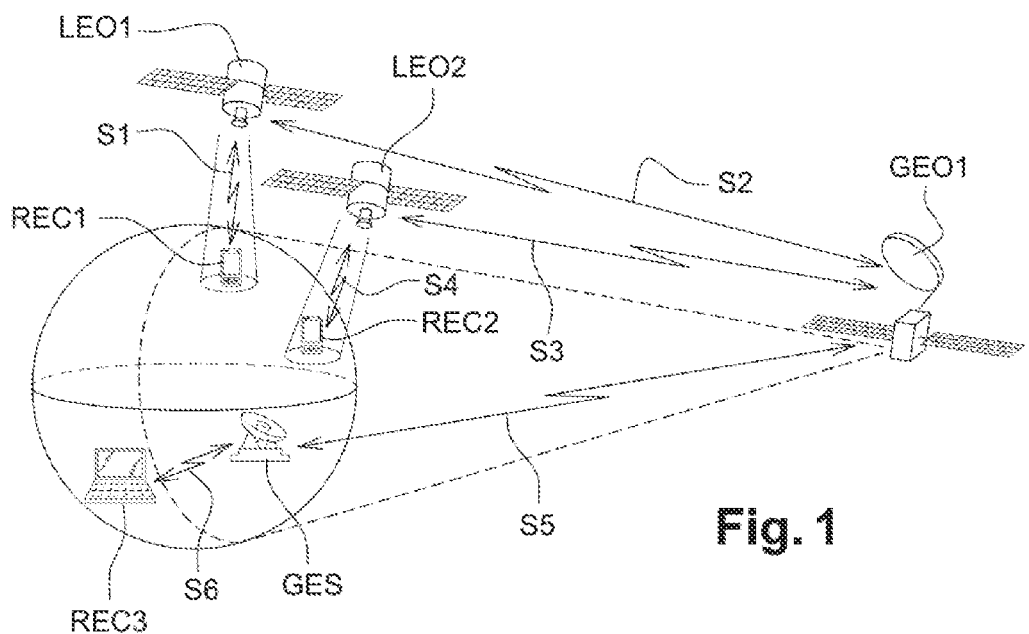
FIG. 1: the general architecture of the system.
Figure 2:
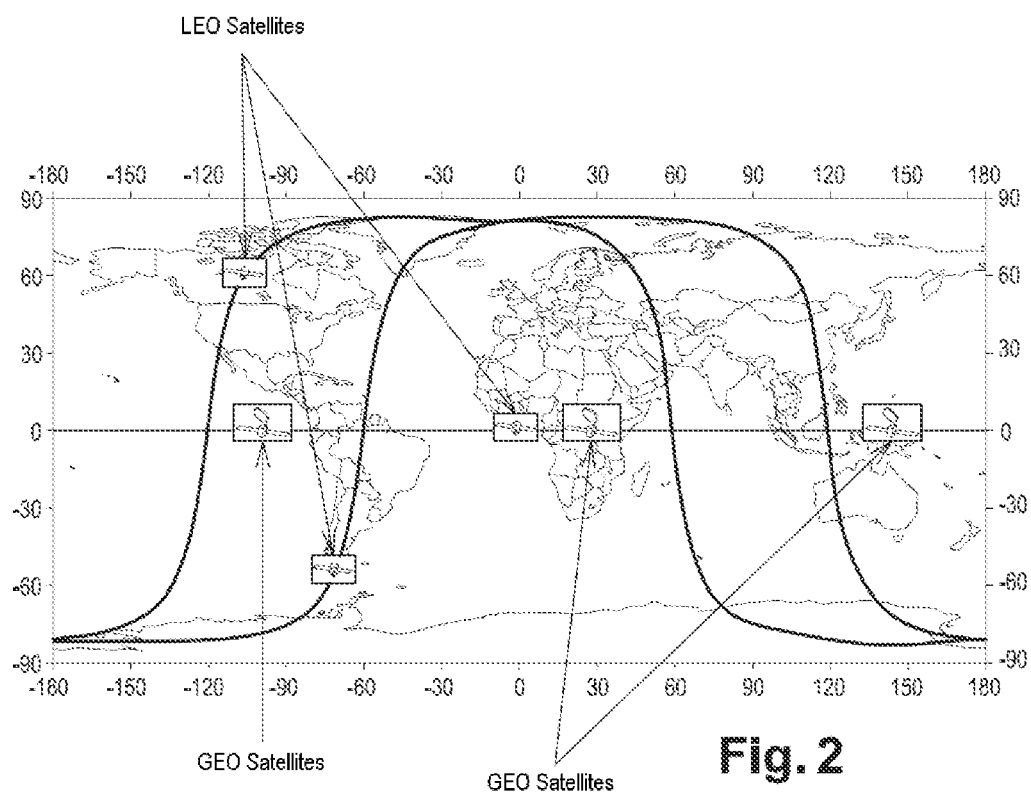
FIG. 2: an illustration of the positions of traveling LEO and stationary GEO satellites on a planisphere, at a given instant.

The architecture of a telecommunication system according to the invention is illustrated by FIGS. 1 and 2. As can be seen in these figures, the system proposed uses two satellite constellations.

The first constellation is made up of one or more stationary satellites (likewise called GEO in the remainder of the description).

In the present case, the system described here by way of non-limiting example is based on a constellation of three stationary satellites GEO1, GEO2, GEO3 that have been put into geostationary orbit above the three main continental areas (for example at longitudes 265° E, 25° E, 145° E, respectively, as illustrated in FIG. 2). The stationary satellites GEO1, GEO2, GEO3 operate in the band called MSS L (1.5/1.7 GHz).

The constellation of the stationary satellites GEO1, GEO2, GEO3 is controlled by one or more terrestrial control stations, arranged in sight of the stationary satellites GEO1, GEO2, GEO3 that they control, which perform the control and remote control functions. The constellation of the stationary satellites GEO1, GEO2, GEO3 is connected to the terrestrial telecommunication networks by one or more terrestrial connection stations GES, arranged in sight of the stationary satellites GEO1, GEO2, GEO3 via a link FL (for "Feeder Link"), in a manner that is known per se.

The system is complemented by a second constellation of three satellites traveling in low or medium orbit (likewise called LEO satellites or MEO satellites), with orbits having altitudes typically between 400 and 20 000 km, acting as repeater satellites. It is clear that the system may use a larger or smaller number of satellites in each of the constellations of traveling LEO and stationary GEO satellites, the difference being more or less complete coverage of Earth.

In the example described here, the traveling satellites are supposed to be of a type moving in low orbit (called LEO) and put into helio-synchronous orbit at an altitude of 567 km with an inclination of 97.7° in three different orbital planes (with straight ascensions of the ascending node at 0°, 60° and 120°). It will be recalled that helio-synchronous orbit is defined by the fact that each traveling satellite flies over again, after several orbits, a same point on Earth at the same local solar time. The present system uses three low orbit satellites: LEO1, LEO2, LEO3, from which the tracks of the orbits are illustrated in FIG. 2 by way of non-limiting example.

In this example, these three satellites traveling in low orbit LEO1, LEO2, LEO3 could be payloads that are on board as "passenger" on satellites for which the main payload is dedicated to another mission, such as the observation of Earth, for example.

It is clear that the constellation of traveling satellites LEO1, LEO2, LEO3 may comprise satellites moving on orbits having different altitudes or inclinations.

These traveling satellites LEO1, LEO2, LEO3 operate in the same frequency band as the stationary satellites GEO1, GEO2, GEO3, and, in the present case, in the MSS L band (1.5/1.7 GHz).

The telecommunication system is aimed at any user, inter alia a mobile user on the surface of Earth, equipped with a transmission/reception terminal (likewise called REC terminal).

In the example illustrated by FIG. 1, the system is aimed inter alia at a user equipped with a transmission/reception terminal REC1 that transmits or receives data to or from another user, who is possibly himself equipped with a transmission/reception terminal REC2, and is likewise possibly mobile on the surface of Earth. The user REC3 may likewise be connected to a terrestrial network (IP, PSTN, . . . ) and connected to the user REC1 via the GES.

Each user terminal REC1 and REC2 is a transportable terminal, comprising inter alia a user interface, for example of keyboard, touch screen or data connection type, to a piece of electronic equipment, a battery and/or power supply means, a processor and/or control electronics, program or data storage means, and signal transmission and reception means, operating in the MSS L frequency band, in the present example described here in a non-limiting manner.

In the present example, each user terminal REC1 and REC2 is equipped with an omnidirectional antenna, adapted to receiving signals emanating indiscriminately from any of the traveling satellites LEO1, LEO2, LEO3 in low orbit, or from any of the stationary satellites GEO1, GEO2, GEO3 in geostationary orbit.

In the implementation described here, each user terminal REC1 and REC2 has a receiver of "Rake" type, which is well-known to a person skilled in the art, for the outward channel. It will be recalled that a Rake receiver is a radio receiver, originally designed to compensate for the attenuation caused by the multiple paths of radio waves for terrestrial systems. It is based on the concept that the reflected signals can be distinguished (typically in the case of use of a CDMA multiplexing technique) and thus can be combined in suitable fashion so as to take then advantage of the multiple propagations. For the return channel, the stationary GEO satellites are supposed to be transparent and the Rake receiver is positioned on the GESs (connection stations for the GEO satellites).

However, it should be noted that, if the stationary GEO satellites were of regenerative type, it would be necessary for them to take on board a Rake receiver (replacing the receiver that has been put on the GES).

Communication between two user terminals REC1, REC2, supposed to be in sight of two traveling satellites LEO1, LEO2 respectively, and of a same stationary satellite GEO1, has a plurality of steps, as shown schematically in FIG. 1:

the first user terminal REC1 transmits a first signal S1 to the first traveling satellite LEO1 in low orbit, the traveling satellite LEO1 receives and amplifies the signal S1 transmitted by the user terminal REC1 on the ground and transmits it in the form of signal S2 to the stationary satellite GEO1 in geostationary orbit, the stationary satellite GEO1 receives the signal S2 and, if conditions so allow, the signal S1 and retransmits them in the form of signal S3 to the second traveling satellite LEO2 in low orbit, either directly (with routing aboard the satellite) or by means of the connection station GES. The signals S1 and S2 are processed by means of a Rake receiver either aboard (assuming onboard routing) or on the station GES (this solution is preferred for reasons of simplifying the implementation), the traveling satellite LEO2 receives and amplifies the signal S3 transmitted by the stationary satellite GEO1 and transmits it in the form of signal S4 to the user terminal REC2 on the ground, the user terminal REC2 receives the signal S4 and potentially the signal S3 if conditions so allow. A Rake receiver allows these two signals to be recombined on the user terminal.

In a case involving user terminals in sight of two different stationary satellites GEO1, GEO2, the link between the two user terminals moreover comprises a communication segment between these satellites, by way of example but in non-limiting fashion, by means of the connection stations GES and of ground links or by means of a direct inter GEO satellite link, if it exists.

It will naturally be understood that it is likewise possible to envisage realizing communication by a user REC1 having a mobile transmitter/receiver terminal with another user REC3 connected through a "conventional" terrestrial telecommunication network (PSTN, IP, . . . ) via the connection station GES.

In this case:

the first user terminal REC1 transmits a first signal S1 to the first traveling satellite LEO1 in low orbit, the traveling satellite LEO1 receives and amplifies the signal S1 transmitted by the user terminal REC1 on the ground and transmits it in the form of signal S2 to the stationary satellite GEO1 in geostationary orbit, the stationary satellite GEO1 receives the signal S2 and potentially the signal S1 and retransmits it in the form of signal S5 to the connection station GES, the connection station GES receives the signal S5 (by combining, when necessary, the signals S1 and S2 contained in S5 by means of a Rake receiver) and transmits it in the form of signal S6 to the user terminal REC3 on the ground via a conventional terrestrial network.

It is noted that, in FIG. 1, the direct links between the user terminals REC1, REC2 and REC3 and the stationary satellite GEO1 are not featured in order to simplify the figure.

Various approaches can be envisaged for the space repeater aboard a traveling satellite LEO1, LEO2, LEO3.

Preferentially, there is simple amplification without frequency translation for the signal received from the stationary GEO satellite. However, this involves the use of an air interface that is capable of supporting the arrival of two signals having a few delay differences and Doppler differences. This is the case of an air interface of CDMA (Code Division Multiple Access) type associated with a Rake receiver, for example.

Alternatively, there is the use of two separate signals (one for the stationary GEO satellite and one for the traveling LEO satellite). By way of example, it is possible to use an air interface of TDMA (Time-Division Multiple Access) type, which is known per se, by envisaging, as one alternative, time multiplexing in order to distribute the capacity between the traveling LEO and stationary GEO satellites (with guard intervals and pre-compensation for Doppler on the traveling LEO satellite). Alternatively, or in addition, it is likewise possible to use two different channels from the frequency band (one for the stationary GEO satellite and one for the traveling LEO satellite).

In the implementation described here by way of example, the first approach has been selected because it affords a simple and effective solution.

The reason is that it makes use of the diversity of the satellites, since the signals coming both from the traveling LEO and stationary GEO satellites can be combined in a Rake receiver in order to obtain a better signal-to-noise ratio. This technique of improving the signal-to-noise ratio makes it possible to obtain a lower transmission error rate ("bit error rate"), a lower transmitted power EIRP (Effective Isotropically Radiated Power) or a greater margin in the link budget.

Furthermore, for a user terminal REC, simultaneously in sight of a traveling LEO satellite and a stationary GEO satellite, if propagation conditions cause the loss of a link to one of the satellites to which it is connected (due to the progression of the geometry of the link to the traveling LEO satellite varying on the basis of time, or due to obstacles in the line of sight of one of the two traveling LEO and stationary GEO satellites), the other link may allow the communication to be maintained.

This concept of simple amplification without frequency translation for the signal received from the stationary GEO satellite can be implemented by virtue of the possibility provided by the Rake receiver, which is included in the user terminal REC, of combining various signals coming from the various paths from a traveling LEO satellite and from a stationary GEO satellite.

In the satellite data communication scenario, which is the subject of the present implementation, the multipath component is generally negligible. In this case, the Rake receiver is used simply to combine a plurality of direct signals from a plurality of traveling LEO and stationary GEO satellites, since the various signals can be considered as components of fictitious "multiple paths".

The signals received can then be combined in the user terminal REC according to three main algorithms, which are known to a person skilled in the art and are therefore not described further here:
- by selection of the best signal (known by the term "selection combining"),
- by simple equal combination of the signals (known by the term "equal gain combining"), or
- by weighted recombination of the signals in order to maximize the total signal-to-noise ratio (known by the term "Maximal Ratio Combining" or MRC). This algorithm is the preferred solution because it has the highest performance in terms of the signal-to-noise ratio obtained.

One of the essential questions linked to the combination of signals is that each channel followed has a possibly very different length owing to the relative position of the elements: user—traveling LEO satellite—stationary GEO satellite. In order to balance the propagation time difference, which likewise varies over time, appropriate data buffers need to be provided on the Rake receiver. The dimensioning of these buffers depends on the worst-case delay difference between the various paths, and on the maximum data transfer rate used.

Figures 3, 4:
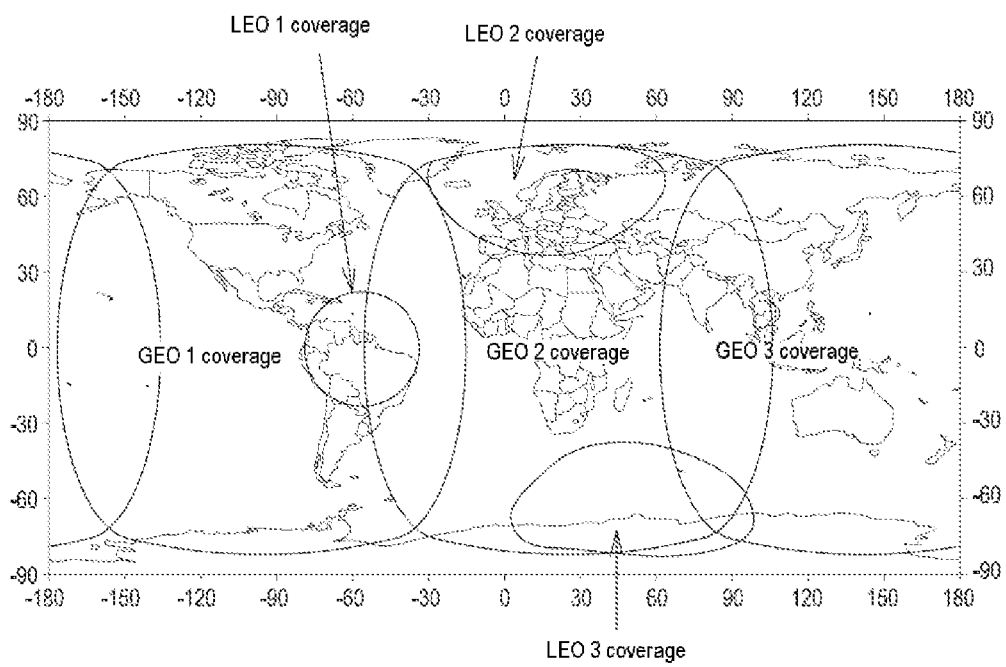
FIG. 3: a table of the orders of magnitude of delays between the signals from a stationary GEO satellite and from a traveling LEO satellite for various LEO orbit altitudes.
FIG. 4: the coverage areas of the traveling LEO and stationary GEO satellites of the constellation described.

In the proposed system, the time difference remains less than 5 ms for the constellation of traveling satellites LEO1, LEO2, LEO3 that is envisaged. The table in FIG. 3 provides a few orders of magnitude for delays for various low orbit altitudes with respect to a stationary GEO satellite in geostationary orbit.

It should likewise be noted that the communication services envisaged for the system according to the invention are preferentially low data rate transmissions. This means that the size of the data buffer that is necessary remains reasonable.

With this approach using a Rake receiver, in the case of a CDMA multiplexing technique, the traveling LEO and stationary GEO satellites do indeed share the same frequency band (MSS L band in the present example) without generating detrimental interference.

Frequency planning and coverage questions likewise need to be taken into consideration, since the LEO and GEO coverage areas need to be coordinated in order to ensure correct operation of the system. In the approach proposed, the coverage of the stationary GEO satellites is made up of a global beam covering the whole visible surface of Earth. This approach makes it possible to avoid or limit the transfer procedures for the traveling LEO satellites (known to a person skilled in the art by the term "handover") between various beams coming from a (or a plurality of) stationary GEO satellite(s). The LEO coverage is therefore included in the coverage of the GEO as illustrated in FIG. 4. The traveling LEO satellites therefore simply relay the signals from the stationary GEO satellites beneath which they are situated.

In the example above:
- the traveling satellite LEO1 relays the signals from and to the stationary satellite GEO1,
- the traveling satellites LEO2 and LEO3 relay the signals from and to the stationary satellite GEO2.

There is no traveling LEO satellite in the coverage of the stationary satellite GEO3 at the instant illustrated by FIG. 4. In fact, the traveling satellite LEO3 is, at this moment, connected to the stationary satellite GEO2.

As any traveling LEO satellite moves into the coverage area of the stationary GEO satellites, it may be visible to various stationary GEO satellites. However, it is supposed that, at a given instant, it is connected to a single geostationary satellite. When a plurality of stationary GEO satellites are in the area of visibility of the traveling LEO satellites, various strategies can be adopted for the choice of the stationary GEO satellite to which the traveling LEO satellite needs to link up (for example using a criterion of the best signal received on the traveling LEO satellite, or a geometric criterion of minimization of the distance between traveling LEO satellite and stationary GEO satellite, which can be predicted in advance on the basis of the ephemerides of the satellites). In the example above, the traveling LEO satellite is connected to the stationary GEO satellite providing the best received signal.

With these assumptions, it is not necessary to conceive complex frequency planning strategies and all satellites (the three stationary GEO satellites and the three traveling LEO satellites) can operate on a single channel of the frequency band used, for example, with multiplexing of CDMA type.

Contrary to the approach of the prior art of Orbcomm or Argos type, the system proposed is capable of providing bidirectional data communications that are based on the fact that the stationary GEO satellite relays the communications of the traveling LEO satellites.

According to this approach, as soon as the user terminal REC1, REC2 is in the area of coverage of a traveling satellite LEO1, LEO2, LEO3, it is possible to communicate therewith bi-directionally and in real time. There is no longer the need for the traveling satellite LEO1, LEO2, LEO3 to be simultaneously able to see the user terminal REC1, REC2 and a ground connection station, which then allows complete coverage of Earth to be envisaged.

The time for communicating with a user terminal REC1 on the ground is then solely a function of the frequency of passage of the traveling satellites LEO1, LEO2, LEO3, which is directly dependent on the orbit chosen for these satellites and on the number of these satellites (which can range up to continuous coverage of the whole of the Earth).

Figure 5:
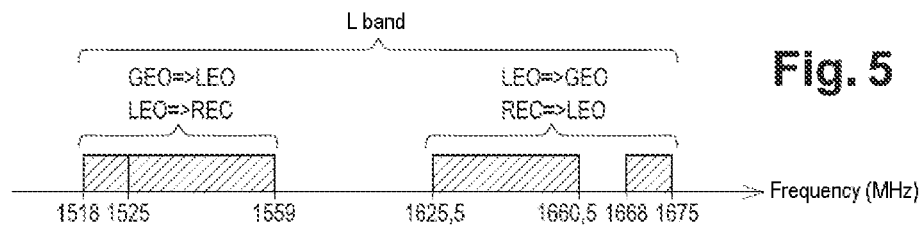
FIG. 5: an example of use of a frequency band in a system according to the invention.

FIG. 5 schematically shows the use, by a telecommunication system according to the invention, of one and the same frequency band for communications between user terminals REC and traveling LEO satellites, and for communications between said traveling LEO satellites and stationary GEO satellites.

More particularly, FIG. 5 shows an example of use of the L band for applications of MSS type.

As illustrated by FIG. 5, the L band is organized into sub-bands that are used either for uplink communications (from a user terminal REC to a traveling LEO satellite and/or a stationary GEO satellite, and from a traveling LEO satellite to a stationary GEO satellite) or for downlink communications (from a stationary GEO satellite to a traveling LEO satellite and/or a user terminal REC, and from a traveling LEO satellite to a user terminal REC). In this example, the L band corresponds substantially to the frequencies between 1.518 GHz and 1.675 GHz, and:

- the sub-band used for downlink communications corresponds to the frequencies between 1.518 and 1.559 GHz,
- the sub-band used for uplink communications corresponds to the frequencies between 1.6265 and 1.6605 GHz, and to the frequencies between 1.668 and 1.675 GHz.

The use of separate frequency sub-bands of the L band for uplink communications and downlink communications corresponds to frequency multiplexing of said uplink and downlink communications, known in the literature by the name "Frequency Division Duplex" (FDD). It will likewise be understood that other types of multiplexing of uplink communications and downlink communications, for example time multiplexing or "Time-Division Duplex" (TDD), code division multiplexing of CDMA type, etc. However, the use of frequency multiplexing FDD corresponds to a preferred mode of implementation since the interference between uplink and downlink communications is reduced, and because the use of time multiplexing TDD may prove complex taking into consideration the propagation delays inherent to satellite telecommunication systems.

In the example shown in FIG. 5, and for uplink communication, a user terminal REC transmits data in a given channel (the frequency sub-band of the L band, used for uplink communications, preferentially having a plurality of such channels) in the direction of a traveling LEO satellite. Preferably, the traveling LEO satellite repeats said data, transparently or regeneratively, to a stationary GEO satellite by using the same channel as that used by the user terminal REC. As indicated previously, the traveling LEO satellite can likewise, as an alternative, repeat said data in an adjacent channel of the frequency sub-band used for uplink communications.

Similarly, for downlink communication, a stationary GEO satellite transmits data in a given channel (the frequency sub-band of the L band, used for downlink communications, preferentially having a plurality of such channels) in the direction of a traveling LEO satellite. Preferably, the traveling LEO satellite repeats said data, transparently or regeneratively, to a user terminal REC by using the same channel as that used by the stationary GEO satellite. As indicated previously, the traveling LEO satellite can likewise, as an alternative, repeat said data in an adjacent channel of the frequency sub-band used for uplink communications.

According to one particularly advantageous implementation of the invention, the uplink transmissions, by a traveling LEO satellite to a stationary GEO satellite, and the downlink transmissions, by said traveling LEO satellite to a user terminal REC, are time multiplexed. In other words, the uplink transmissions and the downlink transmissions by a same traveling LEO satellite are performed during different intervals of time.

The reason is that an important constraint for the design of a telecommunication satellite payload, and for the cost of manufacture thereof, arises from the maximum instantaneous transmission power that needs to be delivered. Owing to the time multiplexing of the uplink transmissions and of the downlink transmissions, said maximum instantaneous transmission power is reduced with respect to the case of simultaneous uplink and downlink transmissions. This is all the more advantageous since, in the case of satellites of small size, the maximum instantaneous transmission power available is generally limited (for example of the order of 60 to 150 W for a satellite with a mass between 100 and 200 kg).

Figure 6:
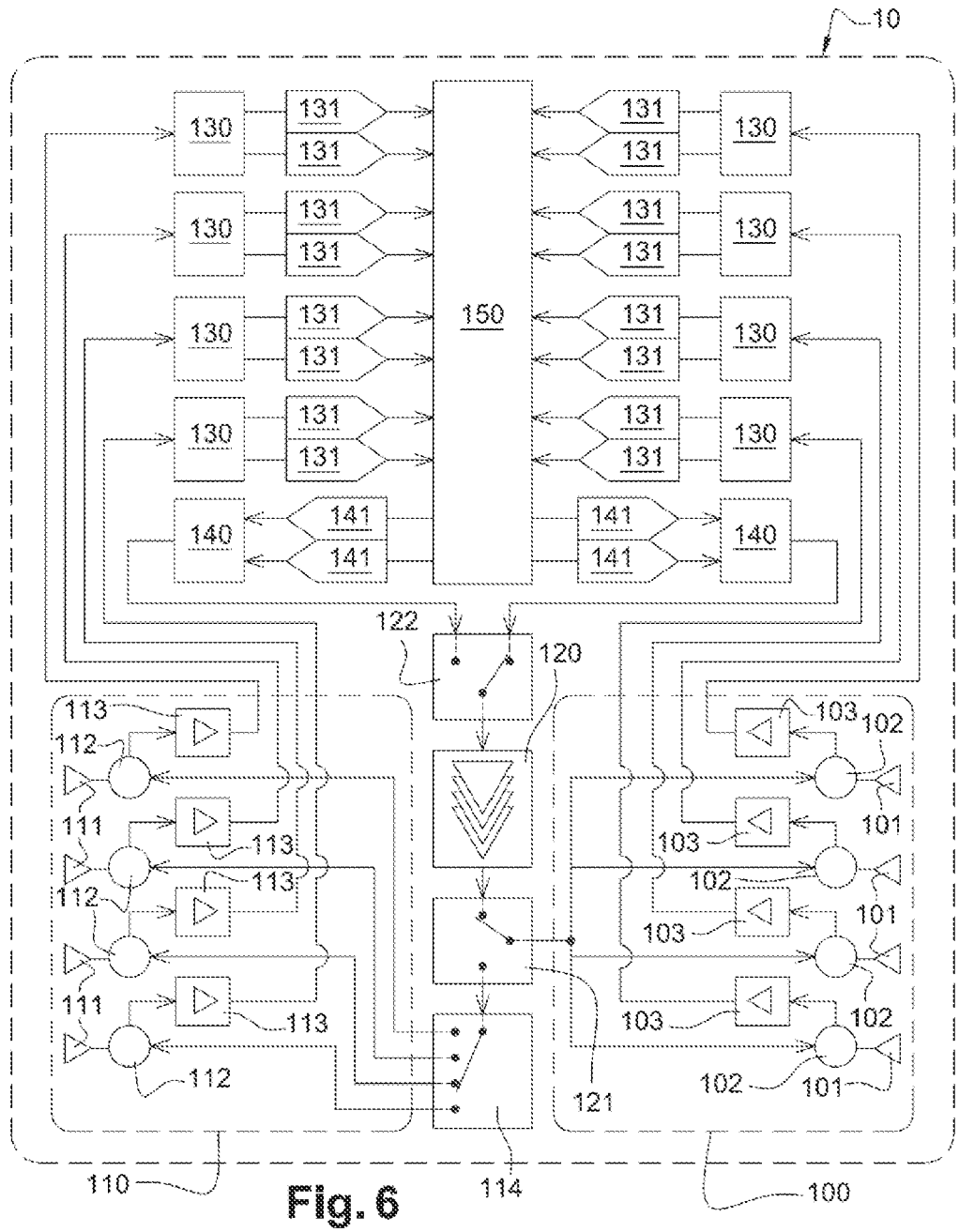
FIG. 6: a schematic representation of a payload for a traveling LEO satellite according to a preferred embodiment.

FIG. 6 schematically shows a preferred embodiment of a payload 10 for a traveling LEO repeater satellite, configured to time multiplex the uplink transmissions to a stationary GEO satellite and the downlink transmissions to a user terminal REC. It is noted that the payload 10 of the traveling LEO satellite may likewise have other elements, which are not shown in FIG. 6.

As illustrated by FIG. 6, the payload 10 has a radio front-end for communications with the stationary GEO satellite(s), referred to as "LEO/GEO front-end" 100, and a radio front-end for communications with the user terminal(s) REC, referred to as "LEO/REC front-end" 110.

In the non-limiting example illustrated by FIG. 6, the LEO/GEO front-end 100 comprises four antennas 101 that are used both for the uplink transmissions and for the downlink receptions. Such use of the antennas 101 both for the uplink transmissions and for the downlink receptions is made possible by the fact that these are performed in the same frequency band, for example in the frequency sub-bands of the L band that are described with reference to FIG. 5. The antennas 101 may be of any suitable type, for example horn antennas, patch antennas, etc.

Each antenna 101 is coupled to two paths, a transmission path and a reception path, for example by means of a circulator 102, of a type that is known per se. This circulator 102 is capable of routing signals on the transmission path to the antenna 101, and of routing signals received by the antenna to the reception path.

Each reception path has a low noise amplifier or LNA 103, which may be of any type that is known per se.

Similarly, the LEO/REC front-end 110 comprises four antennas 111, which are used both for the downlink transmissions and for the uplink receptions, which can be of any suitable type, for example horn antennas, patch antennas, etc.

Each of the antennas 111 is coupled to two paths, a transmission path and a reception path, for example by means of a circulator 112, of a type that is known per se. Each reception path has a low noise amplifier or LNA 113, which may be of any type that is known per se.

Moreover, the payload 10 comprises a power amplifier or PA 120, which may be of any type that is known per se, for example an SSPA (Solid State Power Amplifier) amplifier, a tube amplifier, etc.

In the preferred embodiment illustrated by FIG. 6, the amplifier PA 120 is shared between the LEO/GEO front-end 100 and the LEO/REC front-end 110. In other words, the amplifier PA 120 is used both for the uplink transmissions and for the downlink transmissions. This is made possible, firstly, by the fact that the uplink transmissions and the downlink transmissions are performed in the same frequency band, for example in the frequency sub-bands of the L band that are described with reference to FIG. 5. This is made possible, secondly, by the fact that said uplink transmissions and said downlink transmissions are time multiplexed.

To this end, the payload 10 comprises means for routing a signal at the output of the amplifier PA 120, which is representative of data to be repeated, either to the antennas 101 of the LEO/GEO front-end 100 or to the antennas 111 of the LEO/REC front-end 110. In the non-limiting example illustrated by FIG. 6, said routing means are in the form of a switch circuit 121.

Likewise to this end, the payload 10 has means for multiplexing, at the input of the amplifier PA 120, uplink transmission signals and downlink transmission signals. In the non-limiting example illustrated by FIG. 6, said multiplexing means are likewise in the form of a switch circuit 122.

The payload 10 likewise has demodulator circuits 130, of a type that is known per se, which are coupled to each of the reception paths and at the output of which are obtained two phase quadrature paths known by the name of I and Q paths. The signals obtained on each of these paths are then digitized by means of analog/digital converters 131, of a type that is known per se, in order to be processed by a processing module 150, such as a microcontroller and/or an FPGA.

The signals processed by the processing module 150, representative of the data to be repeated and which are in the form of two paths I and Q to be transmitted in a phase quadrature, are converted into analog signals by means of digital/analog converters 141. The signals at the output of said digital/analog converters 141 are then provided at the input of modulator circuits 140, of a type that is known per se, which are coupled to the switch circuit 122 at the input of the amplifier PA 120.

Moreover, the processing module 150 is coupled to the switch circuit 122 at the input of the amplifier PA 120 and to the switch circuit 121 at the output of the amplifier PA 120, this not being shown in FIG. 6. The processing module 150 is moreover configured to control said switch circuits 121, 122 in substantially synchronized fashion so as to use said amplifier PA 120 either for the uplink transmissions or for the downlink transmissions.

It will be understood that the benefit of the preferred embodiment illustrated by FIG. 6 lies quite particularly in the fact that one and the same power amplifier PA 120 is used either for the uplink transmissions or for the downlink transmissions. Indeed, this contributes to reducing the number of power amplifiers that need to be aboard a traveling LEO satellite, this exhibiting at least the following advantages:

- since power amplifiers are devices that generally consume a large amount of energy, the decrease in the number of power amplifiers necessary makes it possible to reduce the energy needs of the traveling LEO satellite,
- since power amplifiers are devices that are generally bulky, the decrease in the number of power amplifiers necessary makes it possible to manufacture more compact traveling LEO satellites,
- this results in traveling LEO satellites that are less expensive to manufacture and to launch.

According to one variant embodiment of the payload 10, which is likewise illustrated by FIG. 6, the LEO/REC front-end 110 moreover has means for routing a signal at the output of the amplifier PA, more particularly at the output of the switch circuit 121, to any one of said downlink transmission antennas 111.

In the non-limiting example illustrated by FIG. 6, these routing means are in the form of a switch circuit, referred to as "scanning circuit" 114, for example controlled by the processing module 150 (control that is not shown in FIG. 6).

On account of the scanning circuit 114, the payload 10 is capable of activating the antennas 111 in succession for the downlink transmissions. By way of example, if the antennas 111 are directional antennas with different pointing directions, this makes it possible to scan different areas on the surface of Earth in order to repeat data to different user terminals REC while using the maximum instantaneous transmission power for transmission in each of these areas.

Preferably, said payload 10 is configured to activate each of the antennas 111 of the LEO/REC front-end 110 simultaneously during reception. In other words, during the intervals of time in the course of which the payload 10 will perform uplink reception of data from user terminals REC, all the antennas 111 will be connected by their reception path to the processing module 150, which will process the signals received simultaneously in each of these antennas 111. Indeed, this will allow the period during which signals will be able to be received from user terminals REC to be increased.

Nothing precludes, according to particular embodiments, from having a more complex scanning circuit 114 that allows simultaneous activation of a plurality of antennas 111 (two antennas out of four, three antennas out of four, etc.), and successive activation of a plurality of groups of antennas 111.

Moreover, nothing precludes, according to particular embodiments, from likewise providing a scanning circuit for the antennas 101 of the LEO/GEO front-end 100. This may be advantageous for communicating with various stationary GEO satellites, for example, the antennas 101 then exhibiting different pointing directions.

It should be noted that, as a variant embodiment of the payload 10 in FIG. 6, a same switch circuit with one input (that is coupled to the amplifier PA 120) and five outputs (four outputs that are respectively coupled to each of the four antennas 111 of the LEO/REC front-end 110, and one output that is coupled to all the antennas 101 of the LEO/GEO front-end 100) could be used instead of the switch circuit 121 (at the output of the amplifier PA 120) and the scanning circuit 114.

According to one preferred variant of the implementation of the invention, on a traveling LEO satellite, the traveling LEO satellite time multiplexes the uplink transmissions and the uplink receptions. In other words, the traveling LEO satellite does not perform uplink reception during intervals of time in which it performs or might perform uplink transmission.

Preferably, the traveling LEO satellite likewise time multiplexes the downlink transmissions and the downlink receptions. In other words, the traveling LEO satellite does not perform downlink reception during intervals of time in which it performs or might perform downlink transmission.

According to the invention, the communications between user terminals REC and traveling LEO satellites, and for the communications between said traveling LEO satellites and stationary GEO satellites, use one and the same frequency band.

More particularly, if the nonlimiting example illustrated by FIG. 5 is assumed, the uplink communications use a first frequency sub-band of the L band while the downlink communications use a second frequency sub-band of the L band.

It will therefore be understood that, from the point of view of the traveling LEO satellite, uplink transmission to a stationary GEO satellite will be able to disturb simultaneous uplink reception performed by this traveling LEO satellite, insofar as these communications are performed in the same frequency sub-band of the L band. It is likewise the case, from the point of view of the traveling LEO satellite, for downlink transmission simultaneously with downlink reception performed by this traveling LEO satellite.

Such disturbances might be reduced by isolating the LEO/GEO front-end 100 from the LEO/REC front-end 110, but this isolation would be accompanied by the addition of supplementary isolation devices and/or by an increased distance of the antennas 101 of the LEO/GEO front-end 100 and of the antennas 111 of the LEO/REC front-end 110. By virtue of time multiplexing, on the traveling LEO satellite, the uplink transmissions and the uplink receptions, on the one hand, and the downlink transmissions and the downlink receptions, on the other hand, of such disturbances are eliminated. This elimination is obtained without having to add supplementary isolation devices. Moreover, the antennas 101 of the LEO/GEO front-end 100 and the antennas 111 of the LEO/REC front-end 110 can be moved closer, for example arranged on adjacent faces of the traveling LEO satellite.

It should be noted that the time multiplexing, on a traveling LEO satellite, of the uplink transmissions and of the uplink receptions, on the one hand, and of the downlink transmissions and of the downlink receptions, on the other hand, allows the design of the LEO/GEO front-end 100 and the LEO/REC front-end 110 to be greatly simplified from the point of view of electromagnetic isolation. Such arrangements could therefore be envisaged independently of the time multiplexing of the uplink transmissions and of the downlink transmissions, which allows better sharing of the onboard power of the traveling LEO satellite.

However, it will be understood that the combination of the time multiplexing of the uplink transmissions and of the downlink transmissions, and of the time multiplexing of the uplink transmissions and of the uplink receptions, on the one hand, and of the downlink transmissions and of the downlink receptions, on the other hand, allows traveling LEO satellites to be designed to be particularly compact and at better controlled cost.

Figure 7A:
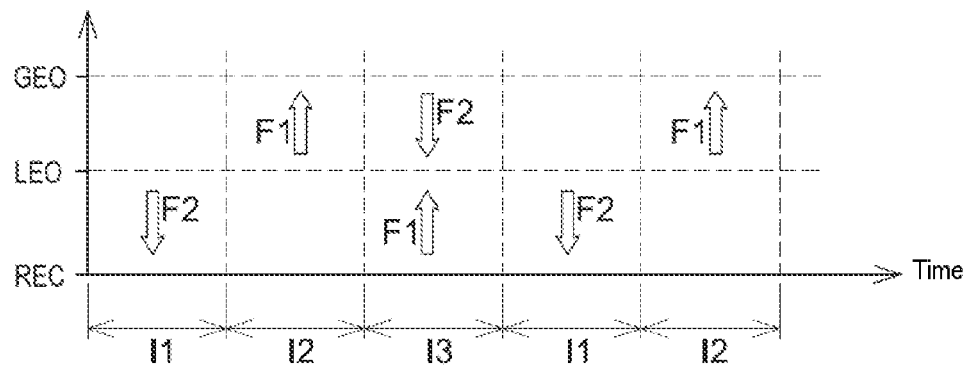
FIGS. 7a and 7b: examples of time multiplexing of communications between a user terminal, a traveling LEO satellite and a stationary GEO satellite.
Figure 7B:
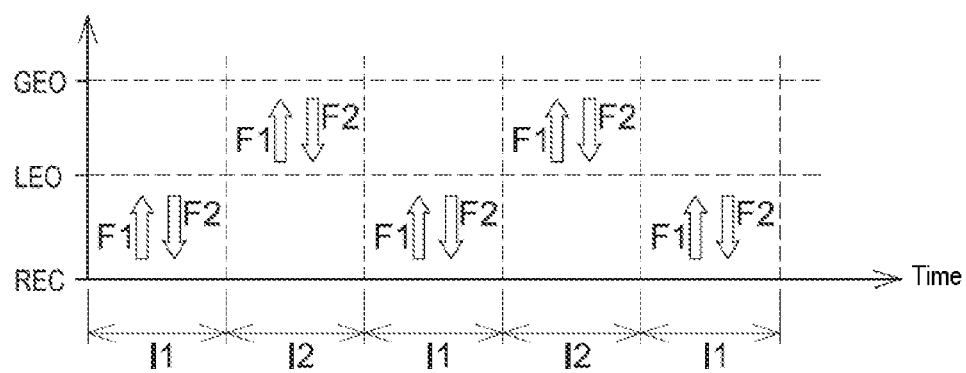

FIGS. 7a and 7b illustrate two implementation examples.

In these examples, F1 has been used to denote the frequency sub-band used for the uplink communications and F2 has been used to denote the frequency sub-band used for the downlink communications.

It should be noted that the examples illustrated by FIGS. 7a and 7b assume the point of view of the traveling LEO satellite. Notably, the following points are noted:

an upward arrow F1 between a user terminal REC and a traveling LEO satellite indicates an interval of time during which the traveling LEO satellite performs reception in the sub-band F1. The absence of such an upward arrow F1 means that said traveling LEO satellite does not perform reception in the sub-band F1, but does not imply that the user terminal REC does not transmit a signal in said sub-band F1; in particular, if conditions so allow, the user terminal REC can transmit a signal directly for the attention of the stationary GEO satellite (the coexistence of the signals transmitted in the sub-band F1 by the user terminal REC and the traveling LEO satellite might be accomplished, for example, with a CDMA air interface and use of a Rake receiver on the ground connection station GES);

a downward arrow F2 between a stationary GEO satellite and a traveling LEO satellite indicates an interval of time during which the traveling LEO satellite performs reception in the sub-band F2. The absence of such a downward arrow F means that said traveling LEO satellite does not perform reception in the sub-band F2, but does not imply that the stationary GEO satellite does not transmit a signal in said sub-band F2; in particular, if conditions so allow, the stationary GEO satellite can transmit a signal directly for the attention of the user terminal (the coexistence of the signals transmitted in the sub-band F2 by the stationary GEO satellite and the traveling LEO satellite might be accomplished, for example, with a CDMA air interface and use of a Rake receiver on the user terminal REC).

In the example illustrated by FIG. 7a, the time multiplexing, on a traveling LEO satellite, is organized mainly in three time intervals I1, I2 and I3.

During a first time interval I1, the traveling LEO satellite performs the downlink transmissions in the sub-band F2 in the direction of one or more user terminals REC.

During a second time interval I2, the traveling LEO satellite performs the uplink transmissions in the sub-band F1 in the direction of one or more stationary GEO satellites.

During a third time interval I3, the traveling LEO satellite performs the uplink receptions in the sub-band F1 and the downlink receptions in the sub-band F2 simultaneously.

This sequence of the time intervals I1, I2 and I3 is preferably performed recurrently. By way of example, the duration of each of these time intervals may be of predetermined fixed value, or variable for determination according to predefined criteria. By way of example, the duration of each of these time intervals might be between a few tenths of a second and a few tens of seconds.

In one preferred embodiment, and as illustrated by FIG. 7b, the payload 10 is configured to perform the uplink receptions simultaneously with the downlink transmissions, and to perform the downlink receptions simultaneously with the uplink transmissions.

As illustrated by FIG. 7b, the time multiplexing is then organized mainly in two time intervals I1 and I2.

During a first time interval I1, the traveling LEO satellite performs the downlink transmissions in the sub-band F2 in the direction of one or more user terminals REC, as well as the uplink receptions in the sub-band F1 for signals possibly transmitted by one or more user terminals REC.

During a second time interval I2, the traveling LEO satellite performs the uplink transmissions in the sub-band F1 in the direction of one or more stationary GEO satellites, as well as the downlink receptions in the sub-band F2 for signals possibly transmitted by one or more stationary GEO satellites.

This sequence of the time intervals I1 and I2 is preferably performed recurrently. By way of example, the duration of each of these time intervals may be of predetermined fixed value, or variable for determination according to predefined criteria. By way of example, the duration of each of these time intervals might be between a few tenths of a second and a few tens of seconds.

Figure 8:
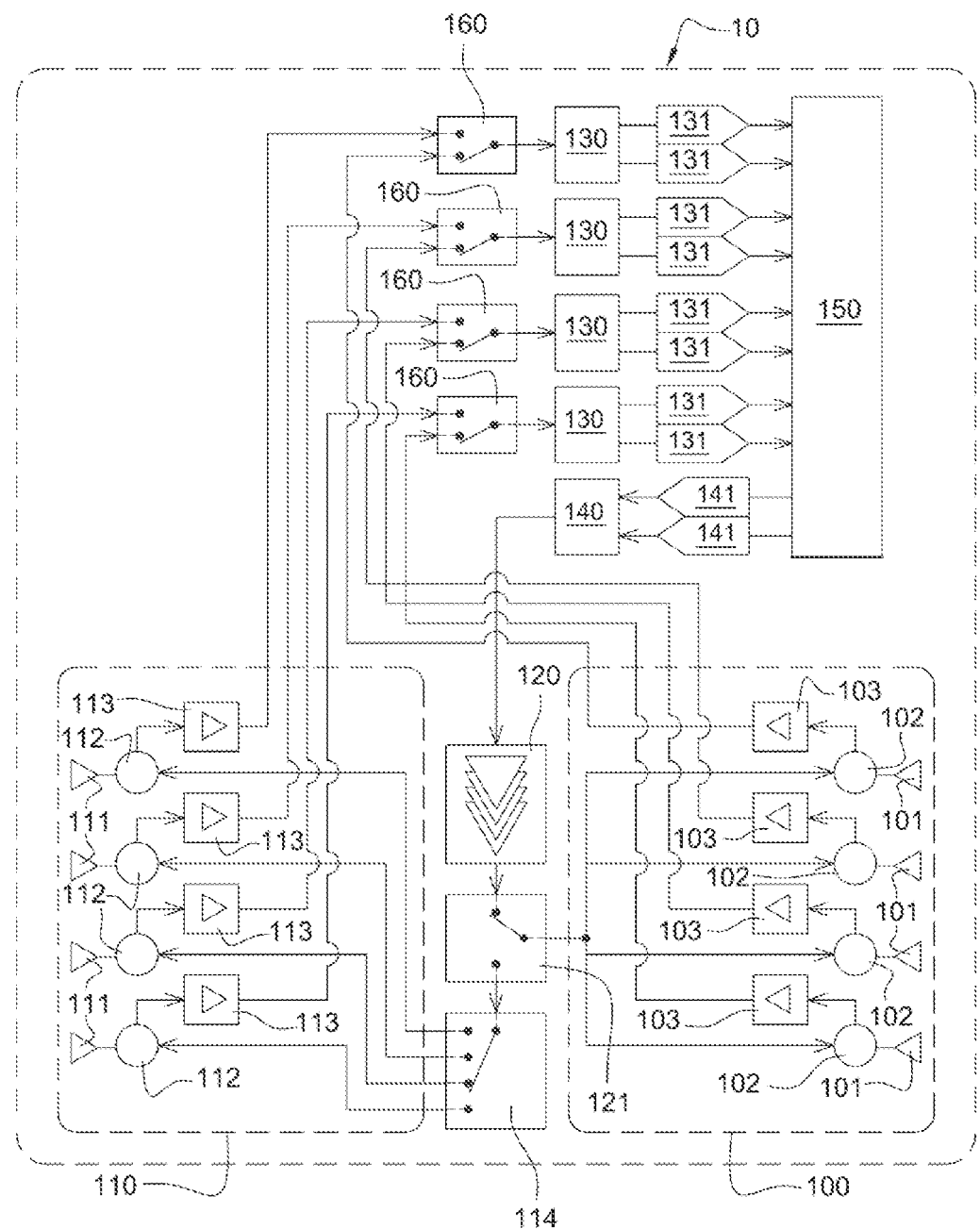
FIG. 8: a schematic representation of a payload according to a variant of the embodiment in FIG. 6.

FIG. 8 shows a variant embodiment of the payload of FIG. 6, adapted for operation of a payload 10 of a traveling LEO repeater satellite as illustrated by FIG. 7b.

With respect to the payload 10 illustrated by FIG. 6, a greater number of components are used both for the communications with one or more stationary GEO satellites and for the communications with one or more user terminals REC.

This is made possible by the fact that these communications, from the point of view of the traveling LEO satellite, are time multiplexed, as underlined by FIG. 7b.

Thus, with respect to the payload 10 illustrated by FIG. 6, the following components are shared:
the modulator circuits 140: the sharing of these components allows the number thereof to be reduced from two to one,
the digital/analog converters 141: the sharing of these components allows the number thereof to be reduced from four to two,
the demodulator circuits 130: the sharing of these components allows the number thereof to be reduced from eight to four,
the analog/digital converters 131: the sharing of these components allows the number thereof to be reduced from sixteen to eight.

With respect to the payload 10 from FIG. 6, the switch circuit 122 at the input of the amplifier PA 120 has been removed, the multiplexing being performed directly by the processing module 150.

On the other hand, switch circuits 160 have been added at the input of the demodulator circuits 130, which are controlled by the processing module 150 (control that is not shown in the figure), in order to connect them both to the LEO/GEO front-end 100 and to the LEO/REC front-end 110.

It will therefore be understood that, due to the use of one and the same frequency band and owing to the time multiplexing of the communications with the stationary satellites and of the communications with the user terminals, it is possible to obtain a payload 10 that is particularly optimized.

It should be noted that other components can likewise be shared, for example the amplifiers LNA 103, 113.

Advantages of the Invention

Thanks to the combination of a constellation of traveling LEO satellites (which allows a higher-performance service to be delivered to polar regions) and of a constellation of stationary GEO satellites (which delivers a quality service to equatorial regions and to low latitudes), the average duration of nonvisibility of a satellite for a user terminal is canceled out or greatly reduced with respect to systems from the prior art, in particular when large angles of elevation are sought (in the case of mobile satellite communications, the blocking factor for the signal is reduced at great elevation, which results in better availability of the service).

It will be understood that a system as described makes it possible to afford greatly increased availability (by means of quasi-continuous coverage) for users who are led to move about in remote areas with little coverage by traditional communication systems. This is the case for polar areas, for example, by means of a constellation in polar or quasi-polar orbit.

Moreover, multiplexing suited to the various transmission/reception tasks for payloads of the traveling LEO satellites allows the design thereof to be greatly simplified and the cost of manufacture thereof to be reduced while preserving a high level of performance.

Other advantages of the invention become particularly apparent when it is compared with existing solutions, using either low orbit satellites or geostationary satellites or hybrid constellations.

In comparison with a satellite communication solution employing a constellation of low orbit satellites (such as Orbcomm or Argos, for example), the advantages provided by the invention are multiple:
it is not necessary to deploy connection stations for the communications between the traveling LEO satellites and the terrestrial network infrastructure; indeed, the connection station for the stationary GEO satellite(s) guarantees permanent access to the traveling LEO satellites;
it is not necessary to deploy remote control/remote measurement & control (TT&C) stations for the constellation of traveling satellites since the TT&C signals are likewise relayed by the stationary GEO satellite(s); it is understood that control of the traveling LEO satellites is performed, from the ground, by the control stations for the stationary GEO satellites, through these stationary GEO satellites;
a greatly simplified design of the traveling LEO satellites on account of operation of the payloads of these traveling LEO satellites allowing the onboard power to be shared between the uplink transmissions and the downlink transmissions, and allowing the electromagnetic isolation needs to be reduced between LEO/GEO front-end and LEO/REC front-end.

In comparison with a satellite communication solution employing a satellite in geostationary orbit, the advantages afforded by the invention are as follows:
extension of the coverage of the stationary GEO satellite in order to cover polar areas, for example,
reduced latency for access to the network and for receiving acknowledgements of receipt.

In comparison with a hybrid satellite telecommunication system (included in the prior art) comprising one or more geostationary orbit satellites and a constellation of low orbit satellites, the advantages afforded by the invention are as follows:
the use of a common protocol between the two systems, which is more effective than each protocol taken separately,
pooling of the frequency band used, with mechanisms ensuring that intrasystem interference is limited.

On account of its design, the concept is particularly suited to user terminals having low directivity and not requiring the pointing in the direction of the low orbit satellites to be maintained. The reason is that it suffices for the user terminal to point to a stationary GEO or traveling LEO satellite in order to ensure the communication.

The envisaged applications concern the improvement of future mobile satellite systems in geostationary orbit (MSS or "Mobile Satellite Services"), including aeronautical mobile satellite services such as AMSS ("Aeronautical Mobile Satellite Service") and AMSRS ("Aeronautical Mobile Satellite Route Services"), in the UHF, L, S, C or X band that rely on the deployment of a low orbit constellation that is much less complex than existing MSS constellations (such as Globalstar or Iridium) for communications of voice or data type or machine-to-machine (M2M) message exchanges.

This concept can likewise be applied to mobile satellite broadcasting systems for data, television or radio (for example radio broadcasting in the standard S-DAB using an L band BSS allocation or mobile television broadcasting in the standard DVB-SH using an S band MSS allocation).

Another use for this concept relates to data exchange for navigation applications (notably maritime or aeronautical). In these applications, that are known to a person skilled in the art by the name SBAS (for "Satellite Based Augmentation System"), there is currently no means for covering mobile terminals situated in the vicinity of the poles. The invention makes it possible to overcome this problem with a geostationary orbit satellite, and a traveling low orbit satellite in sight of the mobile.

Equally, inside a service area for a geostationary satellite, there are areas of shadow for which the geostationary satellite is not directly visible to the surface terminals on account of phenomena of masking by buildings or natural elements (trees, mountains, . . . ). Coverage of an area of shadow for these traditional communication devices may be possible from the moment that this area is able to come into sight of a satellite traveling in low orbit.

The use of a telecommunication system or method in accordance with the invention therefore allows the coverage area of communication means having areas of shadow to be extended, and notably the coverage area of an SBAS system using a geostationary satellite to be extended.

If the space repeater transmits in a channel adjacent to that of the stationary GEO satellite in regenerative fashion, one asset of the invention relates to the possibility of maybe simplifying the protocols for exchanges between the user terminals and the traveling LEO satellites.

The traveling LEO satellites are notably able to implement a conversion to a specific exchange protocol for GEO (for example in order to take account of the constraints of propagation time that are characteristic of GEO), or aggregation of the messages and optimization of the use of the bandwidth.

Another great attraction of this concept is the possibility of having a permanent and more or less realtime connection between the control and mission network and the constellation of traveling LEO satellites through the connection station and the GEO relay.

It will furthermore be understood that the system does not necessarily require the deployment of a dedicated constellation of traveling LEO or stationary GEO satellites. The reason is that it is possible to use transmission capacities that are available on stationary GEO satellite constellations that already exist.

In this case, the frequency band of the constellation of stationary GEO satellites that is used is naturally chosen as the working frequency band for the traveling LEO satellites. This makes it possible to solve the problem of the few frequency bands available for mobile satellite services using nongeostationary satellites, and this therefore provides a regulatory benefit for the deployment of a constellation of traveling LEO satellites operating on a secondary basis in the same frequency band as the stationary GEO satellite(s).

Also, the functions envisaged for the traveling LEO satellites can actually be provided by means of the payloads that are aboard as passengers on traveling LEO satellites dedicated mainly to other functions. In this case, the determining criterion is the orbit envisaged for the traveling LEO satellite. One advantageous choice is that of Earth observation satellites, which frequently use a very inclined heliosynchronous orbit, which therefore covers high latitudes.

This implementation of the payloads as passengers is naturally very advantageous in terms of the cost of deploying the system.

The system described here is therefore a simple and economical solution in comparison with other possible alternatives such as:
  the deployment of a large number of ground stations in order to afford a permanent connection between the traveling LEO satellites and the ground, which is a solution that is costly and complex to implement particularly in order to cover the oceans (the Globalstar constellation is a good illustration of this difficulty);
  the use of intersatellite connections in order to afford a permanent connection between the traveling LEO satellites and a limited number of ground stations; this solution has the disadvantage of adding complexity and additional cost at the level of the space segment (the Iridium constellation is a good illustration of this solution).

Finally, the advantageous and less expensive architecture of the payload, as described previously, makes it possible to reduce the cost of the system without sacrificing its performance. In this case, the significant reduction in the complexity of the traveling repeater satellite platforms used makes it possible to lower the price thereof and/or to increase the number of satellites deployed in the telecommunication system.

Variants of the Invention

The use of space diversity (or of MIMO techniques) on the user terminal in order to recombine the signals coming both from the stationary GEO satellite and from the traveling LEO satellite can be envisaged in order to improve the link budget in supplementary fashion.

The satellite repeater may be a simple "transparent" analog repeater, which is the simplest solution but imposes design constraints on the air interface so as to limit interference on the terminal between the signals coming from the stationary GEO satellite and the signals relayed by the traveling LEO satellite.

An alternative solution is to relay the signal (transparently or regeneratively) in a channel of one and the same frequency band aboard the repeater satellite. This solution requires a coordination entity in order to coordinate the frequency plans between the stationary GEO and traveling LEO satellites.

The constellation of relay satellites may likewise establish additional functionalities ("store & forward", signal aggregations).

The constellation of repeater satellites can provide global or partial coverage of Earth according to the desired aims.

The constellation of repeater satellites can provide coverage that is continuous over time (for realtime services that are available at any instant) or just access with a certain delay (for non-realtime services) using constellations with a smaller number of satellites.

It is likewise clear that the concept described, using the same frequency band for the communications between the surface terminals and the repeater satellites and for the communications between the repeater satellites and the stationary satellites, can be applied just to the outward channel or to the return channel or in both directions.

The invention claimed is:

1. A payload for a repeater satellite in a telecommunication system, said repeater satellite being on a traveling orbit above the surface of Earth, and the payload being configured to repeat data received from a stationary satellite above the surface of Earth to terminals that are substantially on the surface of Earth, and to repeat data received from the terminals to the stationary satellite, wherein said payload comprises:
  a first circuitry configured to use a same frequency band for repeating data to the stationary satellite, referred to as uplink transmissions, and for repeating data to the terminals, referred to as downlink transmissions, said frequency band being any one of the bands VHF, UHF, L, S, C, X, Ka or Q; and
  a second circuitry configured to time multiplex the uplink transmissions and the downlink transmissions, such that said payload does not perform uplink transmissions to the stationary satellite during intervals of time in which said payload performs downlink transmissions to the terminals, and such that said payload does not perform downlink transmissions to the terminals during intervals of time in which said payload performs uplink transmissions to the stationary satellite.

2. The payload as claimed in claim 1, further comprises at least one power amplifier, said payload being configured to use said power amplifier both for the uplink transmissions and for the downlink transmissions.

3. The payload as claimed in claim 2, further comprises:
  at least one uplink transmission antenna;
  at least one downlink transmission antenna;
  a router for routing a signal at an output of the power amplifier, representative of data to be repeated, either to said uplink transmission antenna or to said downlink transmission antenna.

4. The payload as claimed in claim 3, wherein the second circuitry is a multiplexer for multiplexing, at an input of the power amplifier, uplink transmission signals and downlink transmission signals.

5. The payload as claimed in claim 2, further comprises:
  a plurality of downlink transmission antennas; and
  a router for routing a signal at an output of the power amplifier, representative of data to be repeated, to any one of said downlink transmission antennas.

6. The payload as claimed in claim 1, wherein the first circuitry of the payload is configured to use the same frequency band, which is used for the uplink transmissions and the downlink transmissions, for receiving data to be repeated from the terminals, referred to as uplink receptions, and for receiving data to be repeated from the stationary satellite, referred to as downlink receptions.

7. The payload as claimed in claim 6, further comprises a plurality of uplink reception antennas, said payload being configured to receive simultaneously on each of said uplink reception antennas.

8. The payload as claimed in claim 6, wherein the second circuitry of the payload is configured to time multiplex the uplink transmissions and the uplink receptions, or to time multiplex the downlink transmissions and the downlink receptions.

9. The payload as claimed in claim 6, wherein the first circuitry of the payload is configured to use a same first frequency sub-band of the frequency band for the uplink receptions and the uplink transmissions, and to use a same second frequency sub-band of the frequency band for the downlink receptions and the downlink transmissions.

10. The payload as claimed in claim 6, wherein the payload is configured to perform the uplink receptions simultaneously with the downlink transmissions, and to perform the downlink receptions simultaneously with the uplink transmissions.

11. A telecommunication system for transferring data between at least one terminal, situated substantially on the surface of a celestial body, and at least one stationary satellite above the surface of the celestial body, comprising one or more signal repeater satellites, said repeater satellites traveling above the surface of the celestial body and comprising a payload as claimed in claim 1.

12. A telecommunication method for transferring data between terminals, situated substantially on the surface of a celestial body, and a stationary satellite above the surface of the celestial body, the data transfer between said terminals and said stationary satellite being performed by a repeater satellite configured to repeat data received from said stationary satellite to said terminals and to repeat data received from said terminals to said stationary satellite, comprising the steps, by the repeater satellite, of:
  repeating data to the stationary satellite, referred to as uplink transmissions and repeating data to the terminals, referred to as downlink transmissions and utilizing a same frequency band for the uplink transmissions and for the downlink transmissions, said frequency band being any one of the bands VHF, UHF, L, S, C, X, Ka or Q; and
  time multiplexing the uplink transmissions and the downlink transmissions such that said payload does not perform uplink transmissions to the stationary satellite during intervals of time in which said payload performs downlink transmissions to the terminals, and such that said payload does not perform downlink transmissions to the terminals during intervals of time in which said payload performs uplink transmissions to the stationary satellite.

13. The method as claimed in claim 12, further comprising the step of using a same power amplifier for the uplink transmissions and for the downlink transmissions by the repeater satellite.

14. The method as claimed in claim 12, further comprising the step of using the same frequency band, which is used for the uplink transmissions and the downlink transmissions, for receiving data to be repeated from the terminals, referred to as uplink receptions, and for receiving data to be repeated from the stationary satellite, referred to as downlink receptions.

15. The method as claimed in claim 14, further comprising the step of time multiplexing the uplink transmissions and the uplink receptions, or time multiplexing the downlink transmissions and the downlink receptions.

16. The method as claimed in claim 14, further comprising the steps of using a same first frequency sub-band of the frequency band for the uplink receptions and the uplink transmissions, and using a same second frequency sub-band of the frequency band for the downlink receptions and the downlink transmissions.

* * * * *